3,313,832
6-ALKYL-STEROIDS
Cornelis Maurits Siegmann and Stefan Antoni Szpilfogel, Oss, Netherlands, assignors to Organon Inc., West Orange, N.J., a corporation of New Jersey
No Drawing. Filed Feb. 15, 1963, Ser. No. 258,924
Claims priority, application Netherlands, Feb. 21, 1962, 275,090
4 Claims. (Cl. 260—397.3)

The invention relates to new 6-alkyl-steroids of the pregnane series and to a process for the preparation thereof.

More particularly, this invention relates to the new 6-alkyl-steroids of the general formula:

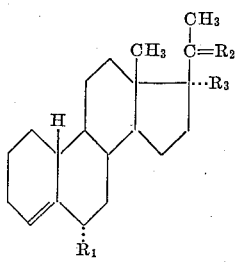

in which $R_1$ = a lower alkyl group,
$R_2$ = H(OH), H(OAcyl), or O, and
$R_3$ = H,OH or OAcyl.

The compounds according to the invention can be prepared starting from $\Delta^4$-3-keto-6α-alkyl-19-nor-pregnene compounds having in 20-position a keto, a hydroxyl or an acyloxy group The preparation of the latter has been described in the co-pending application Ser. 258,925, filed Feb. 15, 1963, now abandoned.

By the process of the present invention the 3-keto group is split off reductively by any method known per se, after which the 20-hydroxyl group may be oxidized to a keto group, and the resulting $\Delta^4$-6α-alkyl-20-keto-19-nor-pregnene compound may be converted into the corresponding 17α-hydroxy-compound by any method known per se and the thus obtained compounds may be esterified in 17 and/or 20-position.

The 3-keto group can be split off in various manners. Thus it is possible to convert the 3-keto compound by one of the known methods into a 3-thioketal followed by the reductive splitting off of the 3-thioketal group, for example by reaction of this compound with an alkali metal in liquid ammonia. This reduction is usually performed in the presence of a solvent, such as an aliphatic ether, dioxane or tetrahydrofuran.

The 3-keto group can be thioketalised by condensation of the 3-keto-steroid with a mercaptan or dithiol in the presence of zinc chloride or hydrochloric acid and a dehydrating agent, such as sodium sulphate.

The 3-keto group is preferably converted into a cyclic thioketal, for example by means of ethanedithiol, propanedithiol or butanedithiol, but non-cyclic thioketals, too, for example those derived from ethyl-mercaptane, propylmercaptane, thiophenol or benzylmercaptan, can be used as intermediates in the present process.

The 3-keto group can also be split off by other methods known per se, for example by reduction of the $\Delta^4$-3-keto compound to the corresponding 3-hydroxy compound, followed by etherification or esterification of this group and the reductive splitting off of the etherified or esterified hydroxyl group present in 3-position.

The 3-keto group can be reduced by one of the common reducing agents, such as an alkali metal borohydride, an alkali metal aluminium hydride, an alkali metal trialkoxy borohydride or aluminium isopropoxide in isopropanol.

The reductive splitting off of the 3-substituent can be performed in a known manner by reacting the relative compound with an alkali metal in the presence of liquid ammonia or a primary amine.

By the process described above the $\Delta^4$-6α-alkyl-20-hydroxy-19-nor-pregnene is obtained.

If desired, this compound can be esterified at the 20-hydroxyl group or converted into the corresponding 20-keto compound by oxidation.

If desired, a 17-hydroxyl group can be introduced into the $\Delta^4$-6α-alkyl-20-keto-19-nor-pregnene obtained after oxidation by any method known per se. One of the conventional method consists in that the 20-keto compound is converted in a known manner into the corresponding 20-enolacylate, whereupon the resulting $\Delta^{17(20)}$-20-acyloxy compound is oxidized to the corresponding 17,20-oxido compound and the latter is finally hydrolysed, for example with an alkali solution, to obtain a 17-hydroxy-20-keto compound.

Before enolacylation of the 20-keto steroid it is advisable to protect the double bond between the carbon atoms 4 and 5 temporarily, for example by adding halogen to this double bond and dehalogenating the 4,5-dihalogen steroid after introduction of the 17-hydroxyl group.

If desired, the resulting $\Delta^4$-6α-alkyl-17α-hydroxy-20-keto-pregnene may be esterified after that with a saturated or an unsaturated carboxylic acid, with 1–30 carbon atoms, preferably with an organic carboxylic acid having 1–18 carbon atoms.

As examples of acids are mentioned: acetic acid, butyric acid, caproic acid, oenanthic acid, capric acid, undecylenic acid, lauric acid, stearic acid, trimethyl acetic acid, hexahydrobenzoic acid, cyclopentyl propionic acid, benzoic acid, phenylpropionic acid and succinic acid.

The compounds according to the invention exercise a progestative anti-oestrogenic and ovulation inhibiting effect. They may be taken up in a liquid or solid pharmaceutical carrier, possibly mixed with other substances, to be administered parenterally or orally in solutions and suspensions, or in pharmaceutical solid dosage unit forms, such as tablets, pills, capsules and coated tablets.

The process according to the invention further illustrated by the following examples.

EXAMPLE I

While stirring 4 ml. of ethane dithiol and 2.5 ml. of borotrifluoride etherate are added to a solution of 10 g. of $\Delta^4$-3,20-diketo-6α-methyl-19-nor-pregnene in 150 ml. of methanol. The reaction mixture is stirred for one hour at room temperature and then poured into water. The aqueous mixture is stirred for another hour, whereupon the precipitate is sucked off, washed and dried to obtain the 3-cyclo-ethylene ketal of the $\Delta^4$-3,20-diketo-6α-methyl-19-nor-pregnene in 95% yield.

A solution of 10 g. of the compound prepared above in 50 ml. of tetrahydrofuran is added to a solution of 5 g. of sodium in 300 ml. of ammonia at +40° C. The reaction mixture is stirred for 15 minutes at −40° C. whereupon 25 ml. of absolute ethanol are added dropwise. Next the ammonia is evaporated, whereupon the mixture is poured into water. By extraction a mixture of $\Delta^4$-6α-methyl-20α-hydroxy-19-nor-pregnene and $\Delta^4$-6α-methyl-20β-hydroxy-19-nor-pregnene is obtained from the aqueous mixture. By chromatography over aluminium oxide these two components are separated.

EXAMPLE II 10 g. of the mixture of 20α- and 20β-hydroxy-$\Delta^4$-6α-methyl-19-nor-pregnene obtained in accordance with Example I are dissolved in 1 l. of acetone, whereupon at 10° C. 10 ml. of a solution of 8 N chromic acid are added. Next the mixture is stirred for 10 minutes at 10° C., after which a little methanol is added to remove the excess of chromic acid. Then the reaction mixture is poured into water, whereupon the aqueous mixture is extracted and the extract evaporated to dryness in vacuo, after which the residue is crystallized from aqueous methanol to obtain the $\Delta^4$-6α-methyl-20-keto-19-nor-pregnene in 80% yield.

EXAMPLE III 10 g. of the mixture of 20α- and 20β-hydroxy-$\Delta^4$-6α-methyl-19-nor-pregnene obtained in accordance with Example I are dissolved in 100 ml. of acetic acid, whereupon 18 ml. of a 2 molar solution of bromine in acetic acid are added while stirring at room temperature. The mixture is stirred for 30 minutes and then poured into water, after which by extraction the 4,5-dibromo-6α-methyl-20-hydroxy-19-pregnane is obtained from it.

By oxidation of this compound with chomic acid by the process described in Example II the 4,5-dibromo-6α-methyl-20-keto-19-nor-pregnane is obtained in 50% yield.

To a solution of 10 g. of this compound in a mixture of 70 ml. of carbon tetrachloride and 30 ml. of acetic acid anhydride 0.5 g. of 2,4-dinitrobenzenesulphonic acid is added at room temperature, whereupon the mixture is stirred for 16 hours. Next 0.8 g. of sodium acetate 3 aq. in 40 ml. of water are added, whereupon the mixture is stirred for 1 hour. After the usual working up 11.0 g. of residue are obtained. This mixture is dissolved in 40 ml. of ethylacetate and 130 ml. of tetrahydrofuran, after which 100 ml. of 1 M monoperphthalic acid are added. After stirring for 16 hours the mixture is poured into an icecold solution of sodium hydroxide, after which the mixture is worked up by extraction to obtain 12.0 g. of crude 17,20-oxido steroid. This residue is dissolved in 90 ml. of ethanol and 90 ml. of tetrahydrofuran. Next 100 ml. of a solution of 2 N sodium hydroxide are added in nitrogen atmosphere, after which the mixture is kept at room temperature for 20 minutes and then neutralized with acetic acid, diluted with water and extracted with methylenedichloride. The extract is washed with water, dried and evaporated to dryness in vacuo. The residue is chromatographed over silicagel to obtain the 4,5-dibromo-6α-methyl-17α-hydroxy-20-keto-19-nor-pregnane in 50% yield.

10 g. of this compound are dissolved in 1 l. of tetrahydrofuran and 300 ml. of acetic acid. Next 20 g. of zinc powder are added in one hour at 40° C., after which the mixture is stirred for 5 hours. Next it is poured into water, whereupon the aqueous mixture is worked up to obtain the $\Delta^4$-6α - methyl-17α-hydroxy-20-keto-19 - nor-pregnene in 76% yield.

In the same manner the $\Delta^4$-6α-methyl-20-hydroxy-19-nor-pregnene has been converted into the $\Delta^4$-6α-methyl-17α-hydroxy-20-keto-nor-pregnene via the 4,5-dichloro compound.

EXAMPLE IV

A mixture of 1.5 g. of $\Delta^4$-6α-methyl-17α-hydroxy-20-keto-19-nor-pregnene, 25 ml. of benzene, 350 mg. of p-toluene sulphonic acid and 1.2 g. of anhydride is refluxed for 15 hours, after which the mixture is poured into water. Next the mixture is stirred for one hour, extracted with ether, washed with water and a solution of sodium bicarbonate and again with water until neutral, after which it is evaporated in vacuo to dryness. The residue is crystallised from ether to obtain the $\Delta^4$-6α-methyl-17α-acetoxy-20-keto-19-nor-pregnene.

In the same manner the 17-esters derived from butyric acid, valeric acid, caproic acid, oenanthic acid, capric acid and β-phenyl propionic acid are prepared.

EXAMPLE V

To a mixture of 2.4 g. of $\Delta^4$-6α-methyl-20α-hydroxy-19-nor-pregnene in 12 ml. of pyridine 3.8 g. of acetic anhydride are added. The solution is kept at room temperature overnight after which 15 ml. of water are added. Then the mixture is stirred for 2 hours and subsequently, after the addition of 100 ml. of water, extracted with ether. The ether extract is washed with 2 N hydrochloric acid, then with 1 N sodium hydroxide, subsequently dried on sodium sulphate and finally evaporated to dryness. The residue is crystallised from ether to obtain the 20-acetate of $\Delta^4$-6α-methyl-20α-hydroxy-19-nor-pregnene.

In an analogous manner also other 20-esters have been prepared, viz. the propionate, trimethyl acetate, valerate, isocaproate, caprylate, laurate and β-phenylpropionate.

In the same manner $\Delta^4$-6α-methyl-20β-hydroxy-19-nor-pregnene has been converted into the 20-esters derived from acetic acid, butyric acid, capronic acid, oenanthic acid and β-phenyl propionic acid.

Using a carboxylic acid chloride instead of the anhydride the above 20α-, and 20β-hydroxy-compounds have been converted into the 20-esters derived from hexahydro benzoic acid, lauric acid and stearic acid.

EXAMPLE VI

To a solution of 1 g. of $\Delta^4$-6α-methyl-17α-hydroxy-20-keto-19-nor-pregnene in 200 ml. methanol is added at a temperature of 0° C. a solution of 158 mg. of sodium borohydride in 25 ml. of methanol.

The mixture is stirred at 0° C. for 2 hours after which it is treated with glacial acetic acid until the pH is 5.4, and evaporated in vacuo. To the residue 200 ml. of water is added and the aqueous solution is extracted with chloroform. The extract is separated, washed with 1 N sodium hydroxide and with water. Subsequently the solvent is evaporated, after which a mixture is obtained of $\Delta^4$ - 6α-methyl-17α-hydroxy-20α-hydroxy-19-nor-pregnene and $\Delta^4$-6α-methyl-17α-hydroxy-20β-hydroxy-19-nor-pregnene.

By chromatography over aluminium oxide these two components are separated.

In accordance with the methods, described in the Examples IV and V these two dihydroxy-steroids have been converted into the 17-mono-, and 17,20-diesters derived from acetic acid, propionic acid, butyric acid, oenanthic acid, decanoic acid, lauric acid and β-phenyl propionic acid.

We claim:
1. $\Delta^4$-6α-methyl-20-keto-19-nor-pregnene.
2. A compound selected from the group consisting of $\Delta^4$-6α-methyl-20α-hydroxy-19-nor-pregnene and 20-acylates thereof derived from an organic carboxylic acid having 1–18 carbon atoms.
3. A compound selected from the group consisting of $\Delta^4$-6α-methyl-20α-hydroxy-19-nor-pregnene and 20-acylates thereof derived from an organic carboxylic acid having 1–18 carbon atoms.
4. A compound selected from the group consisting of $\Delta^4$-6α-methyl-17α,20-dihydroxy-19-nor-pregnene and acylates thereof derived from an organic carboxylic acid having 1–18 carbon atoms.

References Cited by the Examiner

UNITED STATES PATENTS 2,878,267  3/1959  Szpilfogel et al. _____ 260—397.3

OTHER REFERENCES

Fieser et al.: Steroids, pp. 692–696 (1959), Reinhold Pub. Co. New York.

LEWIS GOTTS, *Primary Examiner.*

ELBERT L. ROBERTS, *Examiner.*

HENRY FRENCH, *Assistant Examiner.*